United States Patent [19]

de Jager

[11] Patent Number: 5,269,958
[45] Date of Patent: Dec. 14, 1993

[54] SELF-PRESSURIZED AEROSOL SPOT DRY CLEANING COMPOSITIONS

[75] Inventor: Jan de Jager, De Meern, Netherlands

[73] Assignee: S. C. Johnson & Son, Inc., Racine, Wis.

[21] Appl. No.: 3,910

[22] Filed: Jan. 13, 1993

[51] Int. Cl.$^5$ .................. C11D 17/00; C09K 3/30; C09K 3/22; D06M 13/00
[52] U.S. Cl. ...................... 252/90; 252/8.9; 252/8.6; 252/164; 252/174.25; 252/DIG. 19; 252/305
[58] Field of Search ............ 252/90, DIG. 19, 8.6, 252/8.9, 162, 174.25, 305

[56] References Cited

U.S. PATENT DOCUMENTS

| | | | |
|---|---|---|---|
| 3,161,460 | 12/1964 | Huber | 8/142 |
| 3,207,386 | 9/1965 | Presant et al. | 222/394 |
| 3,694,546 | 9/1972 | Roth et al. | 424/45 |
| 3,714,049 | 1/1973 | Charle et al. | 252/90 |
| 3,794,590 | 2/1974 | Barton | 252/170 |
| 3,925,010 | 12/1975 | Barton | 8/142 |
| 4,013,595 | 3/1977 | Podella et al. | 252/545 |
| 4,243,548 | 1/1981 | Heeb et al. | 252/305 |
| 4,322,037 | 3/1982 | Heeb et al. | 239/337 |
| 4,536,323 | 8/1985 | Stopper | 252/305 |
| 4,584,021 | 4/1986 | Bartlett | 106/14.42 |
| 4,597,895 | 7/1986 | Bartlett | 252/392 |
| 4,600,530 | 7/1986 | Bartlett | 252/392 |
| 4,655,959 | 4/1987 | Stopper | 252/305 |
| 4,780,100 | 10/1988 | Moll | 8/137 |
| 5,089,160 | 2/1992 | Pallone et al. | 252/90 |
| 5,223,244 | 6/1993 | Moro et al. | 424/46 |

FOREIGN PATENT DOCUMENTS 2-202978 8/1990 Japan.
1397475 6/1975 United Kingdom.

OTHER PUBLICATIONS

"Roundtable Discussion: Du Pont talks about its DME propellant, Part I," Aerosol Age, May, 1982, pp. 20ff.
"Dimethyl ether as a propellant in hair sprays," L.J.M. Bohnenn, Aerosol Age, Jun., 1983, pp. 36ff.

*Primary Examiner*—Paul Lieberman
*Assistant Examiner*—Michael P. Tierney

[57] ABSTRACT

A self-pressurized spot dry cleaning composition contains a combination of (a) from about 20% to about 70% by weight of the total composition of dimethyl ether; (b) from about 1% to about 15% by weight of the total composition of water; (c) from about 1% to about 15% by weight of the total composition of a cosolvent for (a) and (b); (d) from about 1% to about 10% by weight of the total composition of a particulate absorbent capable of absorbing a stain from the fabric onto which the composition is sprayed such as fumed or pyrogenic silica; and (e) from about 20% to about 70% by weight of the total composition of dimethoxymethane. Such a spot dry cleaning shampoo composition not only possesses good oil-based stain removal from fabrics such as garments and carpets, but also possesses reduced flammability and static generation characteristics relative to aerosol spot dry compositions using lower aliphatic hydrocarbon propellants without a need for chlorinated or fluorinated solvents or propellants.

9 Claims, No Drawings

SELF-PRESSURIZED AEROSOL SPOT DRY CLEANING COMPOSITIONS

TECHNICAL FIELD

This invention relates to a self-pressurized aerosol composition for spot dry cleaning of fabrics containing a combination of at least dimethoxymethane, water, a cosolvent, and an adsorbent such as silica powder that uses dimethyl ether as the propellant to provide an aerosol fabric spot cleaner composition which not only provides good removal of oil-based stains or soil, but also has the characteristics of reduced flammability and reduced static electricity generation upon puncturing of the container compared with hydrocarbon propellant-based aerosol spot dry cleaning compositions.

BACKGROUND ART

Spot remover compositions for use on fabric materials such as clothing, carpets and upholstery have existed for many years, for example, see British Patent No. 1,397,475 to Loudas. These types of products are used on relatively small areas of fabrics to remove soil and stains due to food or oily materials. Water-based stains require polar solvents while oily soil or stains require relatively nonpolar solvents for proper removal. These solvents are often difficult to combine into a homogeneous composition.

For convenience, aerosol formulations are used so the user can simply spray the composition onto the fabric. Preferably, the compositions can remove the stain without appreciably wetting the fabric which can spread the stain out rather than removing it. Drying time is often critical for garment spot removal because the stain is often only noticed at the time the garment is to be worn. "Dry" cleaning compositions are also important where the garment is sensitive to water and must be commercially dry cleaned rather than simply laundered in water. In addition to long drying times, significant amounts of water to remove stains can cause shrinkage and warping of carpeting and also may promote mold growth. Thus, it would be desirable to have an aerosol composition that can spot dry clean fabrics without leaving the fabric wet to a significant degree.

Many attempts to provide self-pressurized aerosol spot dry cleaning compositions for fabrics have been made. The flammability of such compositions is of concern since the hydrocarbon solvents that are useful in removing oil-based stains tend to be flammable as are the lower alkyl hydrocarbon propellants used in conventional self-pressurized aerosol spray formulations. Halogenated hydrocarbon propellants are not flammable, but have fallen into disfavor due to their adverse ecological impact on the atmosphere.

U.S. Pat. No. 3,161,460 to Huber teaches a self-pressurized aerosol degreasing agent composed of a solvent for fat and grease like difluoromethane or monochloro difluoromethane and a finely divided solid absorbent such as talcum powder, silica gel or siliceous earth. One solvent must be a low boiling solvent such as a fluorinated solvent, unsubstituted aliphatic hydrocarbon, aliphatic alcohol or ketone. The compositions can be used to dry shampoo human hair as well as to spot clean textiles.

U.S. Pat. Nos. 3,925,010 and 3,794,590, each to Barton, teach spot dry cleaning compositions for textile fabrics that use an azeotropic mixture of water, tertiary amyl alcohol and tetrachloro difluoroethane as the cleaning agent. The vapors of the azeotropic mixture are stated as non-flammable.

U.S. Pat. No. 3,714,049 to Charle et al. teaches self-pressurized aerosols composed of a stain removing agent such as a chlorinated hydrocarbon with an isopropanol diluent or a hydrocarbon, a finely divided solid absorbent such as "silicon" powder or talcum powder, and a propellant such as a saturated lower aliphatic hydrocarbon or halogenated hydrocarbon where either or both the stain removing agent and the absorbent are microencapsulated.

U.S. Pat. No. 4,013,595 to Podella et al. teaches non-flammable aqueous aerosol rug cleaners using flammable hydrocarbon propellants such as isobutane, n-butane and propane. They possess reduced flammability due to the presence of at least 0.3% lauryl alcohol in combination with 0.3–10% of an alkali metal lauryl sulfate salt as at least one of the surfactants. These compositions would not be suitable for spot dry cleaning of fabrics since they contain 50-90% water.

In view of the disadvantages of hydrocarbon propellant-based and halogenated hydrocarbon propellant-based products, dimethyl ether has been proposed as an alternative propellant for self-pressurized aerosol products as described in "Roundtable Discussion: Du Pont talks about its DME propellent, Part I," Aerosol Age, May, 1982, pp. 20ff. and "Dimethyl ether as a propellant in hair sprays, L. J. M. Bohnenn, Aerosol Age, June, 1983, pp. 36ff. These articles teach that dimethyl ether can be used as a propellant in place of conventional propellants and has the further advantage of allowing the use of significant amounts of water in such formulations. The water reduces the flammability of the products. Since dimethyl ether is miscible in water up to about 34%, homogeneous aqueous solutions can be formed. To obtain a wide range of homogeneous solutions, a cosolvent such as ethanol can be added to provide water miscability in all proportions. U.S. Pat. Nos. 4,584,021; 4,597,895; and 4,600,530, each to Bartlett, describe the use of various corrosion inhibitors to permit packaging of aqueous dimethyl ether-propelled aerosol formulations in tin-plated aerosol cans.

Japanese Kokai Patent Application No. HEI 2[1990]-202978 to Onizuka et al. teaches an aerosol static inhibitor for treating fiber fabrics in the home. It uses dimethyl ether as the propellant along with ethanol and 6–45% water to deliver a static inhibitor compound such as sodium polyoxyethylene lauryl sulfate to the fibers. This product is used to treat fabrics rather than to clean them.

U.S. Pat. No. 3,207,386 to Presant et al. teaches a non-flammable self-pressurized aerosol dispenser that uses dimethyl ether as a propellant in place of hydrocarbon or halogenated hydrocarbon propellants. The dispenser uses relatively large amounts of water in combination with the dimethyl ether propellant to carry an active ingredient so the spray is said to be non-flammable. The active ingredients are selected to provide hair grooming sprays, paints, window cleaner sprays, foods, nasal sprays and the like. The maximum water solubility of dimethyl ether in water is said to be 35.3% at 24 C. at 5 atmospheres of pressure.

U.S. Pat. No. 3,694,546 to Roth et al. teaches a two-phase aerosol spraying system using dimethoxymethane because it is said to be an excellent solvent for carbon dioxide and nitrous oxide propellants. Example 3 of the '546 Patent uses silica and dimethoxymethane along with acetone and xylene as a stain remover where the propellant is carbon dioxide.

U.S. Pat. No. 4,243,548 to Heeb et al. teaches a self-pressurized aerosol formulation using at least 50% by weight of non-combustible constituents where the propellant is carbon dioxide and dimethyl ether. The formulations must additionally contain at least one of the following non-combustible constituents: water, carbon dioxide, methylene chloride or 1,1,1-trichloroethane. Dimethoxymethane is said to be useful as a solvent for the propellants. Water is preferably 12.9-18% by weight of the total formulation.

U.S. Pat. No. 4,322,037 to Heeb et al. teaches an aerosol container to spray compositions that are free of chlorofluorinated hydrocarbon or hydrocarbon gases. The container can be used to deliver liquids pressurized by dimethyl ether as a propellant. Dimethoxymethane is suggested as a possible solvent for the propellant or the active ingredients to be delivered. The compositions preferably contain 12.9-18% water. Use of chlorofluorinated solvents is preferred in one embodiment although chlorofluorinated propellant gases are to be avoided. Another preferred carrier composition is composed of 54.0-55.0% water, 0.9-1.1% carbon dioxide, 38.5-35.1% dimethyl ether and 9.0-6.4% alcohols having 2 or 3 carbon atoms. The compositions delivered from such containers can be hairsprays, room sprays and cosmetic or medicinal sprays such as deodorants.

As can be seen from the above, various different ingredients have been used in self-pressurized aerosol spray formulations. but none of the above suggests a self-pressurized spot dry cleaning composition that is effective against oil-based stains, and possesses reduced flammability compared with conventional aerosol spray compositions pressurized with lower aliphatic hydrocarbon propellants that are free of undesirable chlorinated or fluorinated solvents and propellants and does not leave the fabric noticeably wet after using.

SUMMARY DISCLOSURE OF THE INVENTION

One object of the present invention is to provide a self-pressurized aerosol composition for spot dry cleaning of fabrics and textiles of the type used for removing stains from garments such as dresses, suits, ties and shirts as well as for carpets, rugs and upholstery and pile fabrics that are cleaned in place. Another object is to provide spot dry cleaning compositions that provide good removal of oil-based stains. Yet another object is to provide self-pressurized spot dry cleaning compositions that are free of chlorinated and fluorinated solvents and propellants. Still another object is to provide self-pressurized aerosol spot dry cleaning compositions that have reduced flammability compared with conventional self-pressurized aerosol spot dry cleaning compositions based upon flammable lower aliphatic hydrocarbon propellants such as propane, isopropane, n-butane and isobutane. It is somewhat surprising that the components used in the compositions of the present invention would have reduced flammability in view of the relatively small percentage of water used in such compositions. A further attribute of the present invention is that the composition generates much less static electricity than does a conventional hydrocarbon propellant-based aerosol spot dry cleaning composition if the container is punctured and the contents are rapidly allowed to escape. In a number of the compositions of the present invention, no static electricity is generated upon puncturing a metal container. As a result, there is a strongly reduced tendency for these compositions to catch fire due to escaping product from a damaged container due to static charge buildup.

Another object is to provide self-pressurized aerosol spot dry cleaning compositions that are substantially free of hydrocarbon solvents and propellants. Another object of this invention is to provide self-pressurized aerosol spot dry cleaning compositions that leave a powder behind which absorbs and removes the stain from the fabric and can then be brushed or vacuumed away from the fabric.

These and other objects and advantages of the present invention are provided by a self-pressurized aerosol composition for spot dry cleaning of a fabric comprising a) from about 20% to about 70%, preferably from about 40% to 60%, and most preferably, from about 45% to 55%, by weight of the total composition of dimethyl ether;

b) from about 1% to about 15%, preferably from about 3% to 11%, and most preferably, from about 5% to 6%, by weight of the total composition of water;

c) from about 1% to about 15%, preferably from about 2% to 10%, and most preferably, from about 2% to 5%, by weight of the total composition of a cosolvent for (a) and (b) which is preferably isopropanol;

d) from about 1% to about 10%, preferably from about 5% to 9%, and most preferably, from about 6% to 8%, by weight of the total composition of a particulate absorbent capable of absorbing a stain from the fabric onto which the composition is sprayed such as precipitated or fumed silica; and e) from about 20% to about 70%, preferably from about 30% to 50%, and most preferably, from about 35% to 40%, by weight of the total composition of dimethoxymethane.

Optionally, these compositions may further contain minor amounts of conventional additives such as corrosion inhibiting compounds, perfumes and compatible organic solvents that are free of halogen groups.

BEST MODE FOR CARRYING OUT THE INVENTION

The propellant used in the self-pressurized aerosol compositions of the present invention is dimethyl ether which is water soluble to about 34-35% by weight. It avoids the need for the use of conventional lower aliphatic hydrocarbon or chlorofluorocarbon propellants. Since dimethyl ether is soluble in water, a sufficient amount of this propellant can be used to adequately pressurize the aerosol container to permit complete exhaustion of the contents of the container. More ecologically desirable gaseous propellants in the form of compressed gases such as nitrogen or air are more susceptible to the effects of misuse of the container such as when the container is sprayed upside down. These gases do not liquefy and thus only a limited amount of such gases can be charged into the aerosol container before the pressure tolerance of the container is reached. If the gases are exhausted by misuse, then the contents of the container may not be fully dispensed from the container. carbon dioxide and nitrous oxide propellants can be dissolved in water, but they present other ecological concerns. Dimethyl ether thus presents a significant advantage as a propellant in the compositions of the present invention.

From about 20% to about 70%, preferably from about 40% to 60%, and most preferably, from about 45% to 55%, by weight of the total composition is dimethyl ether. A sufficient amount of dimethyl ether is used to adequately pressurize the aerosol container used to dispense the spot dry cleaning compositions of the present invention.

To reduce the flammability of the total composition and to help in possibly removing water-based stains, a small amount of water is included. From about 1% to about 15%, preferably from about 3% to 11%, and most preferably, from about 5% to 6%, by weight of the total composition is water. Use of more than this amount of water tends to leave the fabric to be cleaned wet to an undesirable extent. Deionized water or low mineral content, soft water is preferred to minimize the deposit of hard water salts on the fabrics being cleaned.

Another required component of the present invention is from about 1% to about 15%, preferably from about 2% to 10%, and most preferably, from about 2% to 5%, by weight of the total composition of a cosolvent for the water and dimethyl ether. The cosolvent serves several purposes. One is to permit the formation of homogeneous solutions of the liquid ingredients used in the compositions of the present invention. Since dimethoxymethane is not completely soluble in water in all proportions (water solubility is 32.3% at 16° C.), the cosolvent also helps to counteract any detrimental effects that the dimethoxymethane might have on the homogeneity of the solutions in the presence of the water contained in the formulations.

Useful cosolvents are typically polar organic compounds which are (a) liquid at 250° C., (b) sufficiently volatile at 25° C. to evaporate from the fabric in a relatively short period of time so that their presence does not extend the drying time of the composition on the fabric by more than about twice the drying time of the composition without the cosolvent and (c) are miscible in both water and the dimethyl ether as well as in the dimethoxymethane. Cosolvents can also act as solvents to assist in the removal of stains from the fabric to be cleaned.

Examples of useful cosolvents useful are lower alcohols containing 1 to about 4 carbon atoms such as methanol, ethanol, n-propanol, isopropanol, n-butanol, and isobutanol, lower alkyl glycols containing from 2 to about 6 carbon atoms such as ethylene glycol, 1,2-propylene glycol and 1,2-hexylene glycol, lower alkyl ketones containing from 2 to about 6 carbon atoms such as acetone and methyl isobutyl ketone, water soluble lower alkyl glycol ethers containing from about 3 to 8 carbon atoms such as ethylene glycol monoethyl ether, ethylene glycol monomethyl ether, and propylene glycol monomethyl ether. Methanol is less desirable in a consumer product due to its toxicity. Isopropanol is a presently preferred cosolvent.

Another required component of the present invention is from about 1% to about 10%, preferably from about 5% to 9%, and most preferably, from about 6% to 8%, by weight of the total composition of a particulate absorbent capable of absorbing a stain from the fabric onto which the composition is sprayed and has an average particles size which permits it to be sprayed from a self-pressurized aerosol dispenser. Examples of such particulate absorbents are fumed or pyrogenic silica, precipitated silica, surface-treated silica, calcium silicate, calcium carbonate, magnesium silicate, starch, clays, talc, magnesium oxide, and the like. The mean average particle size of such absorbents should be such as to permit spraying from a self-pressurized aerosol dispenser. As described in U.S. Pat. No. 3,161,460, the mean average particle size should be less than about 100 microns, more preferably less than about 50 microns, and most preferably, no more than about 5 to 30 microns. Presently, fumed or pyrogenic silicas and precipitated silicas are preferred. Fumed or pyrogenic silicas are more preferred where the compositions are to be packaged in tin-plated steel aerosol dispenser containers because precipitated silicas tend to contain trace amounts of salts such as chlorides and sulfates which create corrosion problems. Aluminum aerosol containers are more expensive, but present fewer container corrosion problems. Talc, calcium silicate and clays tend to settle to the bottom of the containers after the compositions are prepared and require a greater amount of shaking to redisperse them than do compositions made using the silicas as absorbents.

The self-pressurized aerosol compositions of the present invention principally rely on the solvent power of dimethoxymethane to dissolve oil-based stains. Since it is polar, it can also help to dissolve stains which have a hydrophilic character and can be removed with water. Dimethoxymethane is a well known compound having the chemical formula $CH_3OCH_2OCH_3$. It is also known as methylal or formal and is commercially available from Lambiotte & Cie S.A. of Brussels, Belgium, among other commercial sources. Dimethoxymethane comprises from 20% to about 70%, preferably from about 30% to 50%, and most preferably, from about 35% to 40%, by weight of the total composition.

Optionally, other organic solvents can be used in amounts of no more than about 10% and more preferably, no more than about 5% by weight of the total composition to improve the stain removal characteristics of the compositions of the present invention. Hydrocarbon solvents which are volatile at 250° C. such as pentane, hexane, aliphatic naphthas and the like can be included to improve the effectiveness of the compositions of the present invention against oil-based stains, but at some increase in flammability characteristics as well as a possible decrease in the homogeneity of the liquids making up the compositions. The flammability characteristics are not greatly increased if the amount of such solvents is kept below about 5%, and more preferably, at about 3% or less by weight of the composition.

Conventional corrosion inhibitors can be in included in minor of amounts of no more than about 2% if the compositions are to be stored in tin-plated steel containers or other containers subject to corrosion by the compositions of the present invention. Examples of such corrosion inhibitors are given in U.S. Pat. Nos. 4,584,021; 4,597,895; and 4,600,530 noted above and in the following Examples such as monoethanolamine and DERIPHATO® 151C which is a fatty aminopropionate from Henkel Corp./Emory Group, Cospha/CD of Ambler, Pa., U.S.A.

Other optional ingredients can be conventional additives such as perfumes, preservatives, and the like which do not adversely affect the fabrics to be cleaned. These optional ingredients are usually included in minor amounts which do not exceed about 5% by weight of the total composition and more preferably are no more than about 1% of the total composition.

INDUSTRIAL APPLICABILITY

The self-pressurized aerosol spot dry cleaning compositions of the present invention are low viscosity liquids which are typically less than about 100 centipoise (0.100 pascal.seconds) in viscosity at 25 C. that are suitable for delivery by spraying. They are readily made simply by mixing the liquid components other than the dimethyl ether together at room temperature (25° C.) followed by the addition of the absorbent with vigorous stirring or with the application of shear by means of a homogenizer to enhance dispersion. This mixture is then added to a suitable metal, plastic or glass aerosol container followed by the dimethyl ether propellant. Preferably a conventional metal container such as a tin-plated steel container is used although a more expensive aluminum container may be more desirable since it exhibits less corrosion problems. The container is sealed with a conventional pressurized aerosol valve and fitted with a suitable aerosol spray actuator button capable of delivering the desired type of spray. Optionally, the dimethyl ether can be added to the composition after the container is sealed by adding it through the valve under pressure. Those of ordinary skill in the art can select appropriate aerosol dispensing containers and components for use in spraying the compositions of the present invention. Examples of known containers can be seen from an examination of U.S. Pat. Nos. 3,207,386 and 4,322,037 noted above. The specific containers and components used form no part of the present invention.

The self-pressurized spot dry cleaning compositions of the present invention may be used by shaking the container to insure good dispersion of the adsorbent followed by spraying a quantity of the composition at room temperature onto a stained area of the fabric and allowing it to dry. The absorbent cooperates with the solvents so that after the solvents dissolve the stain, the solvents carry the stain into the absorbent. Upon drying, a light powder of absorbent containing the absorbed stain is left on the fabric which is then brushed or vacuumed away from the fabric to leave a clean fabric surface behind.

The compositions of the present invention have the advantage of leaving behind very little water so that water-based stains do not spread to any significant extent and the fabric remains relatively dry to the touch even though a small amount of water may be left behind which ultimately evaporates. The fast drying solvents used in the present invention such as dimethoxymethane and isopropanol tend to form azeotropic mixtures with water that tend to evaporate away from the fabric more quickly than the individual components themselves.

Thus, the self-pressurized spot dry cleaning compositions of the present invention can be used in the same manner as have other conventional spot dry cleaning compositions to clean away stains on fabrics such as garments, carpets, upholstery and pile fabrics while leaving the fabric relatively dry to the touch so that the fabric item can be used rather quickly after the cleaning operation is finished.

The following Examples are provided to show various aspects of the present invention without departing from the scope and spirit of the invention. Unless otherwise indicated, all parts and percentages used are by weight. In all of the following Examples, the isopropanol used contained a maximum of 0.2% water.

EXAMPLES 1-3

The following Examples show aerosol spot dry cleaning formulations useful in the present invention.

| Example: | 1 | 2 | 3 |
|---|---|---|---|
| Isopropanol | 2.75 | 5.50 | 5.50 |
| Deionized Water | 5.50 | 8.25 | 11.00 |
| Dimethoxymethane | 39.60 | 34.10 | 31.35 |
| Silica Powder[1] | 7.15 | 7.15 | 7.15 |
| Dimethyl Ether | 45.00 | 45.00 | 45.00 |
| Total | 100% | 100% | 100% |

[1]Ketjensil ® SM-604 Precipitated Silicon Dioxide, average particle size (d50) of 11.1 microns, from AKZO, Chemical Division, of Chicago, Illinois, U.S.A.

The above formulations were prepared by mixing the isopropanol, water, dimethoxymethane and silica powder together in that order with mixing. The mixture was mixed thoroughly with a rotor/stator mixer to homogenize the mixture and to get a thorough dispersion. This mixture was added to a conventional tin-plated steel aerosol container. Each container was fitted with a conventional aerosol valve which was crimped onto the neck of the container and then the dimethyl ether was added to the container through the valve under pressure to pressurize the container. A conventional actuator button was then added to the valve stem. The container had to be shaken to redisperse the silica powder before spraying the composition onto a fabric. Each formulation was a single phase homogeneous composition with the silica powder suspended within the composition after shaking well.

The performance of Examples 1-3 was evaluated. The results were compared with experiments previously done using Comparative Example A. A sufficient amount of each composition was sprayed onto a fabric stain to saturate the stained area. It was then allowed to dry to a white powder before the powder was removed with a brush. The stains tested were of the greasy type on cotton drill fabrics and then on swatches with fresh oil stains applied. The performance of each composition was noted for application properties, drying time, stain removal and any other effects such as wicking of the original stain. of the three compositions of the present invention evaluated, Example 1 was found to be most equal in performance to the conventional Comparative Example A. Examples 1-3 were found to be propelled more forcefully than Comparative Example A even though the same containers, valves, and actuator buttons were used for all.

Increasing water content resulted in longer drying times to a white powder, but each of Examples 1-3 dried to a white powder faster than comparative Example A although the fabric was left slightly damp to the touch. Example 3 left a white, pasty powder behind as opposed to the fine dry powder residue left by the other compositions tested.

Example 3 produced the least wicking of the oil stains of any of the other compositions tested. Examples 1-3 each exhibited a markedly reduced wicking of the stain through the fabric onto a tissue placed underneath the fabric when compared with Comparative Example A.

Comparative Example A had very efficient stain removal, especially on vegetable oil stains. Example 3 gave the best stain removal among Examples 1-3.

In a test on blue-dyed polyester/cotton fabric, there was no noticeable difference between any of the compositions tested after the first application of the composition in terms of the residue remaining on the fabric. After more than one application of spot dry cleaning composition to hard to remove stains, significantly more brushing was required to remove the powder left behind by Examples 1-3 than by Comparative Example A.

In the above testing, Example 1 was considered to be the closest to Comparative Example A even though Example 3 gave the best cleaning and had the lowest flammability and the lowest tendency to wick oily stains of any of Examples 1-3. This conclusion was reached because the powder left behind by Example 3 tended to be pasty when dry and left the fabric underneath damp to the touch when the powder was brushed off.

Further tests were run on Example 1 and Comparative Example A on a range of fabrics using both fresh and dried stains. Stain removal of a full range of stains, both water-based and oil-based stains, was evaluated for each composition on white cotton, blue polyester/cotton, and denim fabric. Both compositions were then tested on fresh stains on white cotton, blue polyester/cotton and silk fabrics.

Example 1 showed marked improvement over Comparative Example A in terms of reduced wicking of the oil stains and faster drying time to a white powder. However, Example 1 was slightly less effective on removal of fresh motor oil and vegetable oil stains, but totally removed corn oil and sesame oil stains which Comparative Example A did not totally remove.

The degree of wicking was dependent upon the distance the aerosol container was held from the fabric. Holding the aerosol container closer to the fabric increased the amount of wicking and the degree of wetting of the fabric by both Examples 1 and Comparative Example A. Example 1 possessed reduced wicking of oily stains relative to Comparative Example A.

Example 1 did not cause any noticeable watermarking on silk or any of the dark fabrics tested.

The formula of Example 1 was modified to increase the level of isopropanol and thus a new Example 1A having the same formula as Example 1, but containing 3.85% isopropanol and 38.50% dimethoxymethane, it was evaluated for resistance to static electricity generation upon puncturing of the container.

Example 1A was found to exhibit no static electricity buildup when the metal container was punctured.

Static electricity buildup was measured by placing the container in an isolation test rig equipped with an electrostatic voltmeter from Cam Metric Ltd. with a 0-5 kiloVolt scale. The can puncturing device used is an air operated drill with a 1 millimeter drill bit mounted on an arm which brings the drill bit to a point where it can puncture the container to allow the contents to escape. The purpose of the test is to determine the time in seconds needed for a freshly filled aerosol container to reach an incendive voltage which was established to be 4 kilovolts.

The containers are tested at room temperature (about 21° C. The isolation rig has three functions: (1) to electrically isolate the container; (2) to produce a clean and constant sized puncture in the container wall; and (3) to record the accumulated static charge voltage with time. After removal from the hot bath, the container is shaken five times, placed in the isolation rig and punctured by a remote air switch that starts the drill and causes the arm bearing the drill to swing over to puncture the container. A stopwatch is used to record the time taken for the container to reach a 4 kilovolt potential. A total of five containers are tested and the average time for the five samples to reach 4 kilovolts is reported. Longer times are more desirable.

Examples 1A and 2 were tested for flammability characteristics against a conventional aerosol spot dry cleaning composition ("comparative Example A") composed of a blend of 45% liquefied petroleum gas (LPG 48—SHELLANE® propellant from Shell Chemical Company of Houston, Tex., U.S.A.) and 55% of an intermediate composed of 13% silica powder, 5% isopropanol and 51.3% of a mixture of 37% pentane and 63% heptane ("hydrocarbon Blend") where the balance of the intermediate was 0.1% of a fragrance and 0.6% of a static electricity generation inhibitor (oleyl imidazoline—Amine O 5from Ciba-Geigy Corp., Additives Division, of Hawthorne, N.Y., U.S.A.).

The flammability tests were conducted as follows: The "Drum Test" was modified test of the type described on page 380 of The Aerosol Handbook, First Edition, M. A. Johnsen et al., Wayne E. Dorland Company, Caldwell, N.J., 1972, ("Handbook") using a 55 gallon (208.2 cubic meter) open-head drum having a 1 inch (2.54 cm) hole in the base of the drum about 2 inches (5.08 cm) from the edge. The drum is turned on its side and the hole is placed so it is on the top. The open end of the drum is closed by a closure. A paraffin candle of approximately 1 inch (2.54 cm) in diameter and at least 3 inches (7.62 cm) in height is placed in the middle of the drum on a special metal base. The candle is lit, the drum is closed and testing commences as quickly as possible (in less than about 5 second from closing the drum) at room temperature conditions, preferably about 210C. The aerosol container (at room temperature) is dispensed as quickly as possible into the drum through the hole in the base toward the center of the drum and the candle. The time for an explosion to occur is measured from the time the contents of the container is first dispensed into the drum. The drum is then flushed with compressed air and the oxygen level is checked. The test is repeated two more times and the average of the three tests is reported.

The Ignition Distance and Flame Extension Test was run according to a modified procedure of the type described on page 380 of the Handbook. The containers to be tested were immersed in a 21°±0.050° C. water bath for at least 30 minutes prior to testing. A draught-free area capable of controlled ventilation was selected for the testing. A household paraffin wax candle of 3-5 inches (7.62-12.7 cm) in height was placed in a stand next to a board marked at 10 cm intervals beginning with the center of the candle. The flame candle is set at the same height as the spray emanating from the container. After allowing the container to reach 21° C., the contents are sprayed at the candle flame starting from a distance of one meter from the candle flame. The container is moved steadily closer to the candle flame until the point at which the spray ignites which is recorded (e.g., "x" cm). The process is repeated, commencing at "x" cm+20 cm, more slowly so that a more accurate reading may be obtained. The process is repeated twice and the results of the three tests are averaged and reported as the "Ignition Distance." The average of any flame projection distance beyond the candle is also reported. The average distance of any flashback is also reported. Finally, a note is made of whether or not the flame is self-sustaining after contact with the candle flame.

In some instances, the flame may be extinguished by the force of the spray. In this instance, the test is repeated using a Bunsen burner to determine if this is the case. If so, the Bunsen burner is used to determine the Ignition Distance in place of the candle. If the spray also extinguishes the Bunsen burner, then the spray is reported as having "extinguished the flame" and is thus not flammable according to this testing.

The results of the flammability testing were as follows:

| Example: | 1A | 2 | A |
|---|---|---|---|
| Drum Test | 12 sec | 17 sec. | 7 sec. |
| Ignition Distance | 20 cm | 30 cm | 100 cm |
| Flame Extension | 55 cm S.S.[1] | EXT. FL. | 80-100 cm S S. |
| Flashback | — | — | 10 cm | sec. = seconds
cm = centimeters
EXT. FL. = Extinguished Flame
S.S. = Self Sustaining
[1]Spray could extinguish flame under certain circumstances The results showed that the compositions of the present invention were much less flammable than the conventional composition of Conventional Example A using the same type of aerosol valve and actuator button combination. The Drum Test shows that the compositions of the present invention required significantly more time to build up to an explosive level than did the conventional Comparative Example A. The above three compositions were packaged in a aerosol containers having an aerosol actuator button with a 0.030 inch (0.0076 millimeter) diameter exit orifice. The discharge rate of Example 1A from the aerosol container was 1.7-2.0 grams per second at 21° C. while the discharge rate of Comparative Example A was 1.3-1.8 grams per second at 21° C.

A further experiment using the composition of Example 1A by replacing the aerosol actuator button with one having a 0.023 inch (0.0058 millimeter) exit orifice to obtain a reduced discharge rate. Using that smaller diameter aerosol actuator button, Example 1A resulted in a Drum Test Value of 23 seconds and a Flame Extension Value of about 40 cm where the aerosol spray extinguished the flame instead of being Self Supporting as reported above.

It was also found that some type of a corrosion inhibitor was needed since the tin-plated steel containers showed evidence of corrosion after being filled with the compositions of Examples 1-3.

EXAMPLES 4-7

In these Examples, a small amount of the Hydrocarbon Blend used in Comparative Example A was added to the compositions of the present invention to improve removal of motor oil and other oil-based stains. The compositions used were as follows.

| Example: | 4 | 5 | 6 | 7 |
|---|---|---|---|---|
| Isopropanol | 2.75 | 4.13 | 4.13 | 5.50 |
| Deionized Water | 5.50 | 5.50 | 5.50 | 5.50 |
| Hydrocarbon Blend | 2.75 | 2.75 | 5.50 | 5.50 |
| Dimethoxymethane | 36.85 | 35.48 | 32.73 | 31.35 |
| Ketjensil SM-604 | 7.15 | 7.15 | 7.15 | 7.15 |
| Dimethyl Ether | 45.00 | 45.00 | 45.00 | 45.00 |
| Total | 100% | 100% | 100% | 100% |
| Appearance | Separated | 1 Phase | Separated | 1 Phase |

After the compositions were prepared, the appearance of each was evaluated. Due to the strong nonpolar nature of the Hydrocarbon Blend, only relatively small amounts of such solvents could be added before the composition began to separate into separate phases. These Examples also point out the value of a cosolvent since increasing the amount of isopropanol (Examples 5 and 7) resulted in a single phase composition.

EXAMPLES 8-9

A composition of the present invention was evaluated by a group of ordinary consumers versus a conventional spot dry cleaning composition, Comparative Example A. The composition of the present invention evaluated was as follows.

| Example: | 8 |
|---|---|
| Isopropanol | 3.85 |
| Deionized Water | 5.50 |
| Dimethoxymethane | 38.50 |
| Ketjensil SM-604 | 7.15 |
| Dimethyl Ether | 45.00 |
| Total | 100% |

To avoid potential problems with can corrosion, Example 8 and Comparative Example A were packaged in lined white aluminum containers (fill capacity about 150 milliliters). The same type of valve and actuator button was used for both compositions.

Ninety eight of the 120 respondents (ages 18-55 years) used a brush to remove the powder from the fabric being cleaned while the remainder used their hands or a napkin/handkerchief to brush the powder away from the fabric. The respondents were chosen because they already used a conventional spot dry cleaning composition to remove stains from garments.

The fabric swatches evaluated were prewashed white cotton drill squares with two drops of sesame oil placed in the middle which were prepared the day before evaluation. The respondents were asked to use test product samples to get used to feel of the spray before actually spraying it on a stain. The order of presentation of the blind-labelled containers of each composition was alternated between Example 8 and Comparative Example A so the respondents did not know which composition they were using.

After getting the feel of the spray and the application characteristics, the respondents were asked to apply one of the compositions to a sesame oil-stained fabric swatch. The respondents typically held the containers horizontally when spraying the composition onto the fabric to be cleaned and were noted to be extremely critical in their assessment of the compositions they evaluated. After shaking the container, the compositions were sprayed rather close to and directly onto the stain in a short burst. The respondents were then asked their opinion of the force of the spray and the smell of the composition when sprayed. Although the drying time increased as more composition was sprayed onto the stain by holding the container close to the stain, the total amount of each composition used was estimated to be about the same.

Once the product dried to a white powder, the respondents were asked their opinion of the drying time and their satisfaction with it. The respondents were then asked to brush the powder off and to assess the stain removal and give their overall opinion. The swatch was then removed and kept out of sight of the respondent.

The above procedure was then repeated for the other composition being evaluated.

Finally, the first swatch was placed side-by-side with the second swatch in front of the respondent. The respondent was asked to compare the two compositions in terms of performance and which one the respondent would be more likely to purchase for use.

Example 8 was reported to be significantly better than Comparative Example A in terms of the length of the drying time and satisfaction with length of drying time. Example 8 was reported to be significantly worse than Comparative Example A in terms of the smell of the product. This was not unexpected since Example 8 did not contain any fragrance while Comparative Example A contained a fragrance to mask the solvent odors. No statistically significant difference was noted between Example 8 and Comparative Example A in terms of force of spray, stain removal ability and overall product performance. Overall, Example 8 was found to be the best of the two compositions tested.

When asked to directly compare swatches cleaned with one of Example 8 versus one cleaned with Comparative Example A, more respondents preferred the swatch cleaned with Example 8 over the one cleaned with Comparative Example A for reasons of efficiency and would thus be more likely to purchase and use a product like Example 8.

EXAMPLES 10-16

These Examples show compositions containing corrosion inhibitors to permit use of the compositions of the present invention in tin-plated steel containers. It was found that the precipitated silicas of the type such as Ketjensil SM-604 contain small amounts of chlorides and other salts that increase the corrosivity of compositions containing such silicas which are packaged in tin-plated steel containers. The following Examples also use calcium silicate and different silicas such as fumed silicas, AEROSILO® FK320 and FK160, as well as Ketjensil SM-604 precipitated silica since the fumed silicas do not contain the salts present in precipitated silica. The formulations tested in tin-plated steel containers and the results of the testing after 10 days and after 33 days at 40° C. were as follows.

| Example: | 9 | 10 | 11 | 12 |
|---|---|---|---|---|
| Isopropanol | 4.40 | 4.40 | 4.40 | 4.40 |
| Deionized Water | 5.50 | 5.50 | 5.50 | 5.50 |
| Dimethoxymethane | 39.32 | 39.32 | 39.26 | 39.26 |
| AEROSIL FK320[1] | — | 2.75 | 2.75 | 4.40 |
| AEROSIL FK160[2] | 2.75 | — | — | 1.10 |
| Ketjensil SM-604 | — | — | — | — |
| CALFLO ® C[3] | 2.75 | 2.75 | 2.75 | — |
| DERIPHAT ® 151C[4] | 0.28 | 0.28 | 0.28 | 0.28 |
| Monoethanolamine | — | — | 0.06 | 0.06 |
| Dimethyl Ether | 45.00 | 45.00 | 45.00 | 45.00 |
| Total | 100% | 100% | 100% | 100% |
| 10 Day Appearance[5] | N.C. | N.C. | N.C. | S.R.S. |
| 33 Day Appearance[5] | N.C. | (6) | (7) | (8) |

| Example: | 13 | 14 | 15 |
|---|---|---|---|
| Isopropanol | 4.40 | 4.40 | 4.40 |
| Deionized Water | 5.50 | 5.50 | 5.50 |
| Dimethoxymethane | 39.26 | 39.21 | 39.21 |
| AEROSIL FK320[1] | — | 4.40 | — |
| AEROSIL FK160[2] | 1.10 | 1.10 | 1.10 |
| Ketjensil SM-604 | 4.40 | — | 4.40 |
| CALFLO ® C[3] | — | — | — |
| DERIPHAT ® 151C[4] | 0.28 | 0.28 | 0.28 |
| Monoethanolamine | 0.06 | 0.11 | 0.11 |
| Dimethyl Ether | 45.00 | 45.00 | 45.00 |
| Total | 100% | 100% | 100% |
| 10 Day Appearance[5] | N.C. | N.C. | N.C. |
| 30 Day Appearance[5] | N.C. | (9) | N.C. |

N.C. = No Corrosion Noted
S.R.S. = Slight Rust Spot
[1]Fumed silica of 15 micron average particle size from Degussa Corporation, Pigments Division, of Ridgefield Park, New Jersey, U.S.A.
[2]Fumed silica of 7 micron average particle size from Degussa Corporation, Pigments Division.
[3]Synthetic Calcium Silicate wherein only 4% is retained on a 325 mesh (44 micron) screen from Celite Corporation of Lompoc, California, U.S.A.
[4]A fatty aminopropionate from Henkel Corp./Emory Group, Cospha/CD of Ambler, Pennsylvania, U.S.A.
[5]Appearance of container interior after accelerated corrosion testing by storing in a hot room at 40° C.
(6) Spots of corrosion noted on container side weld and dome.
(7) Corrosion tubicale growing on weld-pit found under it, other container exhibited no corrosion.
(8) Corrosion seen on side weld (particularly on the cut edge) and near the bottom on the necked-in portion of the sidewall immediately above the bottom container seam.
(9) Spots of corrosion seen on container side weld.

A number of containers of each formulation were stored in a hot room at 40° C. Two containers of each composition were opened each time the container interiors were checked for corrosion. After 10 days of accelerated corrosion testing, only Example 13 showed a small rust spot. After 33 days, Examples 10-12 and 14 exhibited some evidence of container corrosion while Examples 9, 13 and 15 showed no corrosion at either inspection. After 33 days of hot room storage, each of the two containers evaluated for each Example produced an adequate spray of spot dry cleaning composition.

That which I claim is:

1. A self-pressurized aerosol composition for spot dry cleaning of a fabric comprising
   a) from about 20% to about 70% by weight of the total composition of dimethyl ether;
   b) from about 1% to about 15% by weight of the total composition of water;
   c) from about 1% to about 15% by weight of the total composition of a cosolvent for (a) and (b) wherein the cosolvent is selected from the group consisting of lower alcohols containing 1 to 4 carbon atoms, lower alkyl ketones containing from 2 to about 6 carbon atoms, lower alkyl glycols containing from 2 to about 6 carbon atoms, and water soluble lower alkyl glycol ethers containing from about 3 to 8 carbon atoms;
   d) from about 1% to about 10% by weight of the total composition of a particulate absorbent capable of absorbing a stain from the fabric onto which the composition is sprayed wherein the absorbent is selected from the group consisting of fumed silicas, pyrogenic silicas, precipitated silicas, surface-treated silicas, calcium silicate, calcium carbonate, magnesium silicate, starch, clays, talc, and magnesium oxide; and
   e) from about 20% to about 70% by weight of the total composition of dimethoxymethane.

2. The spot dry cleaning composition of claim 1 wherein the absorbent has a mean average particle size of no more than about 100 microns.

3. The spot dry cleaning composition of claim 1 wherein the absorbent has a mean average particle size of no more than about 50 microns.

4. The spot dry cleaning composition of claim 1 wherein the absorbent has a mean average particle size of no more than about 5 to 30 microns and is selected from the group consisting of fumed silicas, pyrogenic silicas,, precipitated silicas and surface-treated silicas.

5. The spot dry cleaning composition of claim 2 containing from about 40% to 60% of (a), from about 3% to 11% of (b), from about 2% to 10% of (c), from about 5% to 9% of (d) and from about 30% to 50% of (e).

6. The spot dry cleaning composition of claim 5 wherein (c) is selected from the group consisting of lower alcohols containing 1 to 4 carbon atoms, lower alkyl ketones containing from 2 to about 6 carbon atoms, lower alkyl glycols containing from 2 to about 6 carbon atoms, and water soluble lower alkyl glycol ethers containing from about 3 to 8 carbon atoms, and (d) has a mean average particle size of no more than about 50 microns and is selected from the group consisting of fumed silicas, pyrogenic silicas, precipitated silicas, and surface-treated silicas.

7. The spot dry cleaning composition of claim 1 containing from about 45% to 55% of (a), from about 5% to 6% of (b), from about 2% to 5% of (c), from about 6% to 8% of (d) and from about 35% to 40% of (e).

8. The spot dry cleaning composition of claim 7 wherein (c) is selected from the group consisting of lower alcohols containing 1 to 4 carbon atoms, lower alkyl glycols containing from 2 to about 6 carbon atoms, and water soluble lower alkyl glycol ethers containing from about 3 to 8 carbon atoms, and (d) has a mean average particle size of no more than about 5 to 30 microns and is selected from the group consisting of fumed silicas, pyrogenic silicas, precipitated silicas, and surface-treated silicas.

9. The spot dry cleaning composition of claim 8 wherein (c) is isopropanol and (d) is selected from the group consisting of fumed silicas, pyrogenic silicas and precipitated silicas.

* * * * *

UNITED STATES PATENT AND TRADEMARK OFFICE
CERTIFICATE OF CORRECTION

PATENT NO. : 5,269,958
DATED : December 14, 1993
INVENTOR(S) : Jan de Jager

It is certified that error appears in the above-identified patent and that said Letters Patent is hereby corrected as shown below:

In column 15, line 5, the second occurance of "6" should be --5--, whereby Claim 6 depends from Claim 5.

Signed and Sealed this

Fourteenth Day of February, 1995

Attest:

BRUCE LEHMAN

Attesting Officer          Commissioner of Patents and Trademarks